J. F. O'CONNOR.
FRICTION SHOCK ABSORBING MECHANISM.
APPLICATION FILED SEPT. 23, 1918.
1,302,080. Patented Apr. 29, 1919.
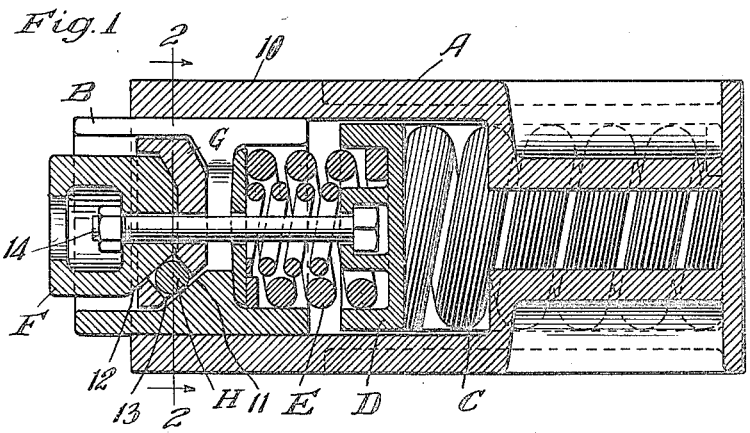
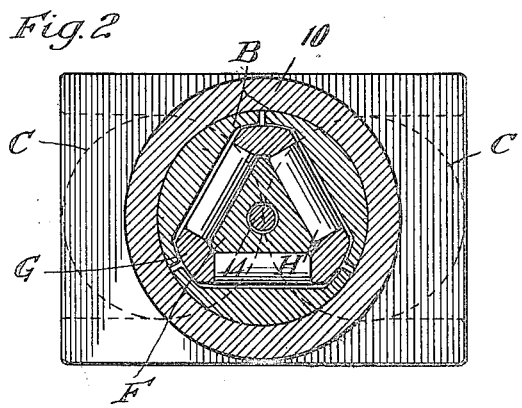
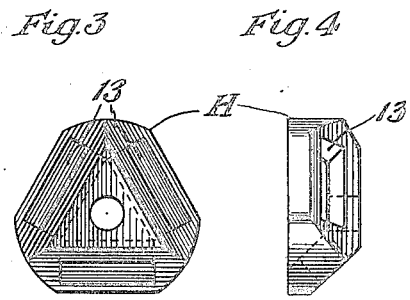
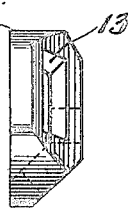
Inventor
John F. O'Connor
By George I. Haight
Atty

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,302,080.          Specification of Letters Patent.    Patented Apr. 29, 1919.

Application filed September 23, 1918. Serial No. 255,240.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

Heretofore, in the art of friction shock absorbing mechanisms, and more particularly friction shock absorbing mechanisms employed in railway draft riggings, it has been customary to employ a cylindrical friction shell with three circularly arranged friction shoes coöperable therewith, there being a wedge disposed within the friction shoes. In order to obtain the necessary keenness of wedging angle and at the same time effect certain release, an anti-friction roller has been employed between each set of coöperating wedge faces on the wedge proper and friction shoes. To maintain these rollers in proper position, the wedge and shoes have necessarily been formed with shoulders forming opposed seats for the rollers. The formation of these seats on the wedge, which is necessarily of triangular form in order to coöperate with the three friction shoes and produce the most efficient radial pressure at three points around a circle, has necessitated manufacturing the wedge in the form of a casting. Many attempts have been made to form the triangular shaped wedge with its roller seats by drop forging but these attempts have proved more or less abortive, particularly on account of the inability to provide suitable dies which will form the triangle shape of the wedge and at the same time incorporate thereon the under-cut roller seats in three different planes. For numerous reasons, a drop forged wedge is superior to the cast wedge, the principal reason being that a wedge formed by drop forging is assured of having its three wedge faces in the exact required relation.

The object of my present invention is to provide a wedge arrangement more particularly adapted for friction mechanisms of the type above referred to and wherein the wedge may be satisfactorily made as a drop forging and the necessary means provided for maintaining the anti-friction rollers in their proper relation with respect to the wedging means and shoes.

In the drawing forming a part of this specification, Figure 1 is a longitudinal, central, sectional view of a friction shock absorbing mechanism of a type well known in the railway draft rigging art, the shock absorbing mechanism showing my improvements applied thereto. Fig. 2 is a transverse, sectional view, taken substantially on the line 2—2 of Fig. 1. Fig. 3 is an inner end view of the roller keeper; and Fig. 4 is a side view thereof.

In said drawing, A denotes a casting which combines a friction shell and spring casing, as hereinafter described; B—B designate three friction shoes; C designates the main springs of the shock absorbing mechanism; D represents a spring follower; E represents a preliminary spring; F designates the improved wedge proper; G designates the roller keeper; and H designates the anti-friction rollers.

The casting A is formed with a cylindrical friction shell 10 at its forward end and rearwardly thereof is of general rectangular form with the sides opened so as to admit the main springs C, of which there are preferably two. The friction shoes B are three in number and are circularly arranged, the shoes being provided on their exterior with cylindrical friction surfaces coöperable with the interior cylindrical friction surface of the shell. Each shoe B is also provided on its inner side with a plain or flat wedge face 11. As will be understood, the follower D bears against the front ends of the main springs C and the preliminary spring E is interposed between the friction shoes and the follower D so that a slight movement takes place between the friction shoes and the follower D before the latter is moved rearwardly to compress the main spring C.

To force the friction shoes radially into proper frictional contact with the friction shell 10, the wedge means consisting of the wedge proper F, keeper G and rollers H are provided. The wedge proper F is formed on its inner end with three plain or flat wedge faces 12—12 arranged to correspond with the three wedge faces of the friction shoes, that is, the wedge faces 12 are disposed in such manner that a transverse section through the wedge proper F will give an equilateral triangle in cross section, as clearly shown in Fig. 2. By forming the wedge proper F as described, it is evident that the same can be readily made as a drop forging between two dies since there are no under-cut surfaces or projecting shoulders and the inner wedge-shaped portion proper of the wedge member F can be formed against a simple female die and the male member of the die applied to the outer end of the wedge and if necessary within the opening shown therein. In other words, the wedge proper F as shown in the drawing, can be formed between two dies which are moved relatively to each other in lines parallel to the axis of the cylinder 10. In the older constructions where the wedge member has been formed with roller seats, attempts to manufacture the wedge as a drop forging between dies has necessitated bringing the dies together in a direction transversely of the wedge and due to the triangular shape of the wedge, these attempts have proven unsatisfactory.

To maintain the rollers in proper relation with respect to the wedge proper in the friction shoes, I provide the keeper G which is in the form of a relatively heavy plate or cap adapted also to be formed as a forging between dies, the same being made to fit the wedge faces of the wedge proper F. The keeper G is made of a thickness slightly less than the diameter of the anti-friction rollers so as to insure clearance between the keeper and the wedge faces of the friction shoes. The keeper is also provided with three through slots or openings as indicated at 13—13 to accommodate the anti-friction rollers and prevent the latter from being displaced in any direction with respect to the wedge proper F, although permitting the necessary relatively slight rotative movement of the rollers. The wedge proper F and keeper G are suitably apertured to accommodate a retaining bolt 14 in a well known manner.

With my arrangement, I am enabled to manufacture the wedge proper by forging means and overcome the difficulties heretofore encountered in the particular art referred to and I thereby obtain the beneficial results incident to the manufacture of a forged wedge proper as distinguished from those heretofore necessarily manufactured as castings.

I claim:

1. In a friction shock absorbing mechanism, the combination with a friction shell, a plurality of friction shoes having inner wedge faces and coöperable therewith, and spring means to resist relative movement between said shoes and shell; of wedging means coöperable with the shoes, said wedging means including a wedge proper having a plurality of flat wedge faces corresponding in number to the wedge faces of the shoes and opposed thereto, an anti-friction roller interposed between each wedge face of a shoe and the corresponding wedge face of the wedge proper, and a roller keeper formed to fit over the wedge faces of the wedge proper, the portions of the keeper interposed between the wedge proper and shoes being of lesser thickness than the diameter of the rollers, said keeper having slots therein to accommodate said rollers and maintain the latter in proper position.

2. In a friction shock absorbing mechanism, the combination with a friction cylinder, three friction shoes circularly arranged within said cylinder and coöperable therewith, each shoe having an inner wedge face, and spring means to resist relative movement between said shoes and shell; of a wedge proper disposed within said shoes and having three flat wedge faces arranged to correspond with those of the shoes, an anti-friction roller interposed between each set of wedge faces of the wedge proper and shoes, and a separate roller keeper arranged to fit over the wedge faces of the wedge proper, said keeper being provided with slots to accommodate the anti-friction rollers, the portions of the keeper interposed between the wedge proper and the shoes being of lesser thickness than the diameter of the rollers.

In witness that I claim the foregoing I have hereunto subscribed my name this 13th day of Sept. 1918.

JOHN F. O'CONNOR.